United States Patent [19]

Mitsuhashi

[11] Patent Number: 4,567,408
[45] Date of Patent: Jan. 28, 1986

[54] DIGITALLY CONTROLLED RECTIFYING SYSTEM FOR DRIVING A MOTOR

[75] Inventor: Masamichi Mitsuhashi, Hyogo, Japan

[73] Assignee: Mitsubishi Denki Kabushiki Kaisha, Tokyo, Japan

[21] Appl. No.: 687,025

[22] Filed: Dec. 28, 1984

Related U.S. Application Data

[63] Continuation-in-part of Ser. No. 616,475, Jun. 1, 1984, abandoned.

[30] Foreign Application Priority Data

Jun. 3, 1983 [JP] Japan .................................. 58-99676

[51] Int. Cl.[4] .............................................. H02P 5/16
[52] U.S. Cl. .................................... 318/317; 318/257; 318/314; 318/606; 318/599
[58] Field of Search ........... 318/257, 284, 289, 345 C, 318/345 CA, 345 G, 314, 317, 318, 329, 610, 608, 606, 607, 609

[56] References Cited

U.S. PATENT DOCUMENTS

| | | | |
|---|---|---|---|
| 3,413,534 | 11/1968 | Stringer | 318/308 |
| 3,487,279 | 12/1969 | Stringer et al. | 318/345 C |
| 3,590,350 | 6/1971 | Munson | 318/269 X |
| 3,617,844 | 11/1971 | Grygera | 318/331 |
| 4,090,116 | 5/1978 | Lippitt | 318/345 E |
| 4,263,557 | 4/1981 | Tarvinen | 318/341 |
| 4,268,782 | 5/1981 | Kawada et al. | 318/332 X |
| 4,277,825 | 7/1981 | Johnson | 318/257 X |
| 4,471,281 | 9/1984 | Uezumi et al. | 318/318 X |

*Primary Examiner*—William M. Shoop, Jr.
*Assistant Examiner*—Shik Luen Paul Ip
*Attorney, Agent, or Firm*—Bernard, Rothwell & Brown

[57] ABSTRACT

A digitally controlled rectifying system used for driving a d.c. motor through antiparallel connected forward and reverse converters. The firing phase angle of the converters is shifted by 180° at a time of gate switching operation for the converters so that the load current is formed to become zero, and after the gate switching operation the firing phase angle is shifted to a position at which the load current is substantially zero, whereby the time lag of control occurring at the switching operation of the converters can be minimized irrespective of the load condition.

3 Claims, 7 Drawing Figures

DIGITALLY CONTROLLED RECTIFYING SYSTEM FOR DRIVING A MOTOR

This application is a continuation-in-part of copending application Ser. No. 616,475, filed June 1, 1984, now abandoned.

BACKGROUND OF THE INVENTION

1. Field of the Invention

The present invention relates to a digitally controlled rectifying system used for driving an electric motor.

2. Description of the Prior Art

Conventionally, there have been used rectifying systems of the analog control type for driving electric motors as shown in FIG. 1. The system arrangement of FIG. 1 includes a motor driving rectifying system 1, a d.c. motor 2, a forward converter 3 made up of a 3-phase thyristor bridge, and a reverse converter 4 also made up of a 3-phase thyristor bridge. The control system is of a feedback system comprising a speed control loop and two minor loops of the current and voltage feedback.

The rectifying system 1 incorporates a speed controller 5 made of an operational amplifier configured to provide proportional and integral functions, a terminal 6 for receiving a speed command signal, a terminal 7 for receiving a feedback speed signal which is produced uninterruptedly by a pilot generator 8 associated with the motor 2, a current controller 9 made up of an operational amplifier configured to provide an integral function, an output terminal 10 of the speed controller 5 which provides the current command signal, a terminal 11 for receiving a feedback current signal which is produced in response to the input a.c. current detected by an a.c. current transformer (ACCT) 12, a voltage controller 13 made up of an operational amplifier configured to provide a first-order time lag function, an output terminal 14 of the current controller 9 which provides a voltage command signal, a terminal 15 for receiving a feedback voltage signal which is produced in response to the d.c. output voltage by a voltage sensor 16 provided across the motor 2, a gate pulse generator 17 incorporating a $\cos^{-1}$ function for providing a linearized output voltage for a phase command signal with a bias voltage Eb being applied thereto in order to stabilize the gate switching operation for the forward and reverse converters 3 and 4 as will be explained later, a forward/reverse switching logic circuit 18 for selecting the output of the gate pulse signal (a) and (b) for the forward and reverse converters 3 and 4, and gate pulse switches 28a and 28b for conducting gate pulses to the forward and reverse converters 3 and 4.

The forward/reverse switching operation of the foregoing conventional rectifying system will be described.

Symbols ⊕ and ⊖ shown at the inputs and outputs of the speed, current and voltage controllers 5, 9 and 13 represent the polarity of respective control signals when the motor 2 rotates in a forward direction.

FIG. 2 is a graph used to explain the correlation between the input signal of the gate pulse generator 17, i.e., the output signal 19 of the voltage controller 13, and the d.c. output voltage. In the figure, the solid line shown by A represents the characteristics when the load current flows continuously, the shaded portion shown by B represents the characteristics when the load current flows intermittently, and the dashed lines shown by C represent the state in which the load current is completely cut off. The provision of the dead band is to prevent the forward and reverse converters 3 and 4 from becoming conductive simultaneously, and for this purpose the output characteristics of both converters are biased by a predetermined amount of ±Eb volts with respect to the output signal of the voltage controller 13. The voltage level shown by Ec in the graph represents the counter electromotive force produced by the motor 2 when it rotates in the forward direction. When the speed controller 5 is given a deceleration command via the terminal 6, its output signal at the terminal 10 decreases from a positive value and then enters the negative region. Since the current controller 9 has an integral property, its negative output signal at the terminal 14 when evaluated as an absolute value starts decreasing at a rate proportional to the product of the reciprocal of the integrating time constant and the input error signal. On the other hand when the output signal 19 of the voltage controller 13 has decreased down to the input signal level $V_1$, the load current becomes a complete zero, causing the output signal of the current controller 9 to vary solely in response to the current command signal at the terminal 10.

When the voltage controller 13 has reversed the polarity of the output signal from positive to negative, the switching logic circuit 18 operates on the gate pulse signal by its output signals Sa and Sb to switch from the forward converter 3 to the reverse converter 4. When the output signal 19 has reached the input signal level $-V_2$, the current starts flowing through the reverse converter 4, bringing the motor 2 in a regenerative operating mode, and the motor speed starts falling. In the meantime when the output signal 19 varies from the input level $V_1$ to $-V_2$, no load current flows in the motor 2, and it is an idle time for the control system. This idle time cannot be nullified due to the bias Eb provided for the output of the voltage controller 13 in order to prevent a short-circuit of the forward and reverse converters 3 and 4, and to make the matter worse the idle time is significantly affected by the gain of the current controller 9 and voltage controller 13.

Therefore, it has been logically impossible for the conventional motor driving rectifying system of the analog control type to reduce the switching time because of the need for the bias voltage Eb for stabilizing the switching operation of the forward and reverse converters. Moreover, the gain of the current controller 9, which is determined depending on the properties of the motor and load, could cause a very long idle time for the converter switching operation in some cases.

SUMMARY OF THE INVENTION

It is a primary object of the present invention to provide a digitally controlled motor driving rectifying system which overcomes the foregoing prior art deficiencies.

Another object of the present invention is to provide a high response and high controllability rectifying system which considerably reduces the gate switching time and, thus, eliminates the time lag of the control system.

Other objects and advantages of the present invention will be apparent from the following detailed description of a certain preferred embodiment taken in conjunction with the accompanying drawings.

DESCRIPTION OF THE PREFERRED EMBODIMENTS

Figure 1:
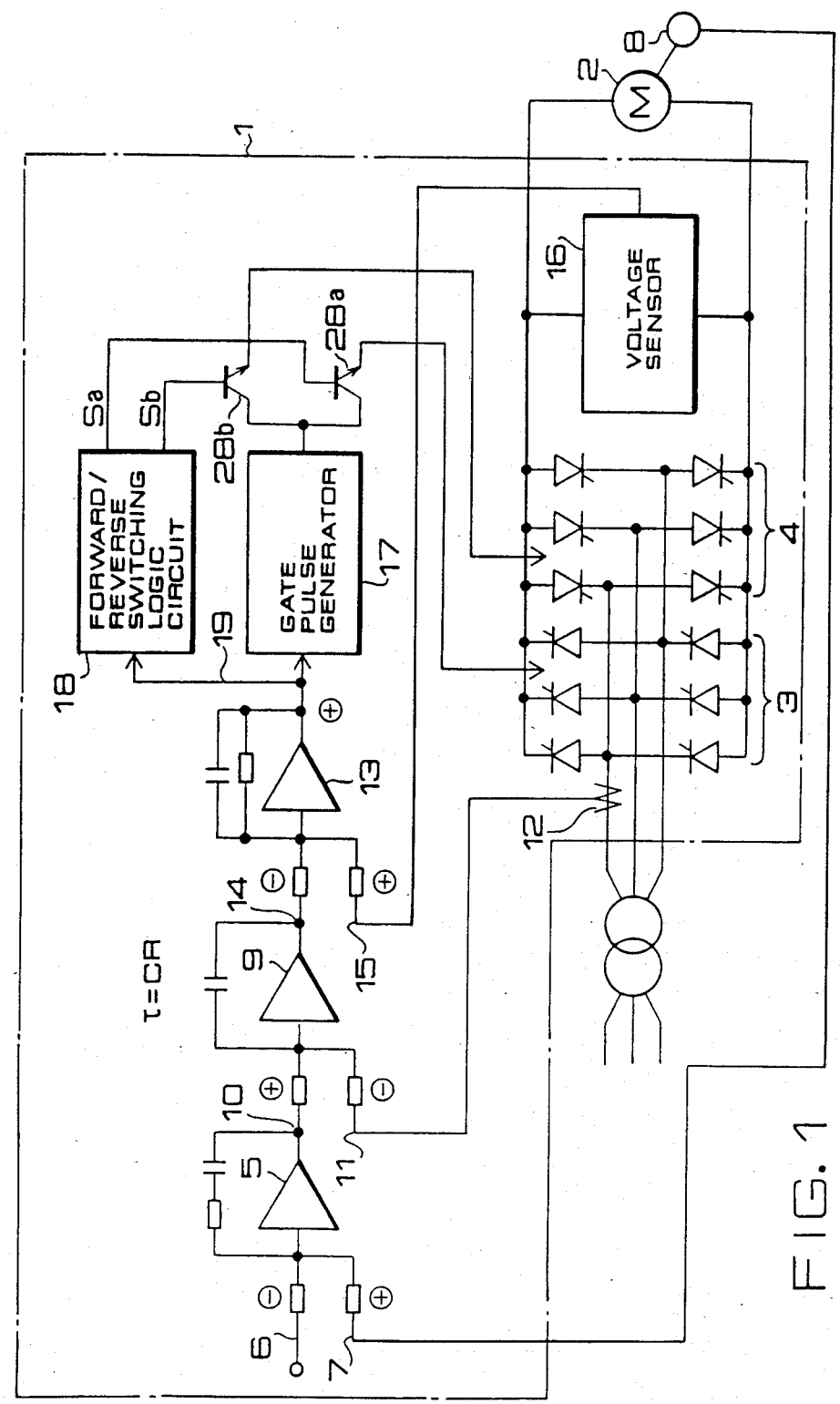
FIG. 1 is a block diagram showing the conventional motor driving rectifying system of the analog control type.
Figure 2:
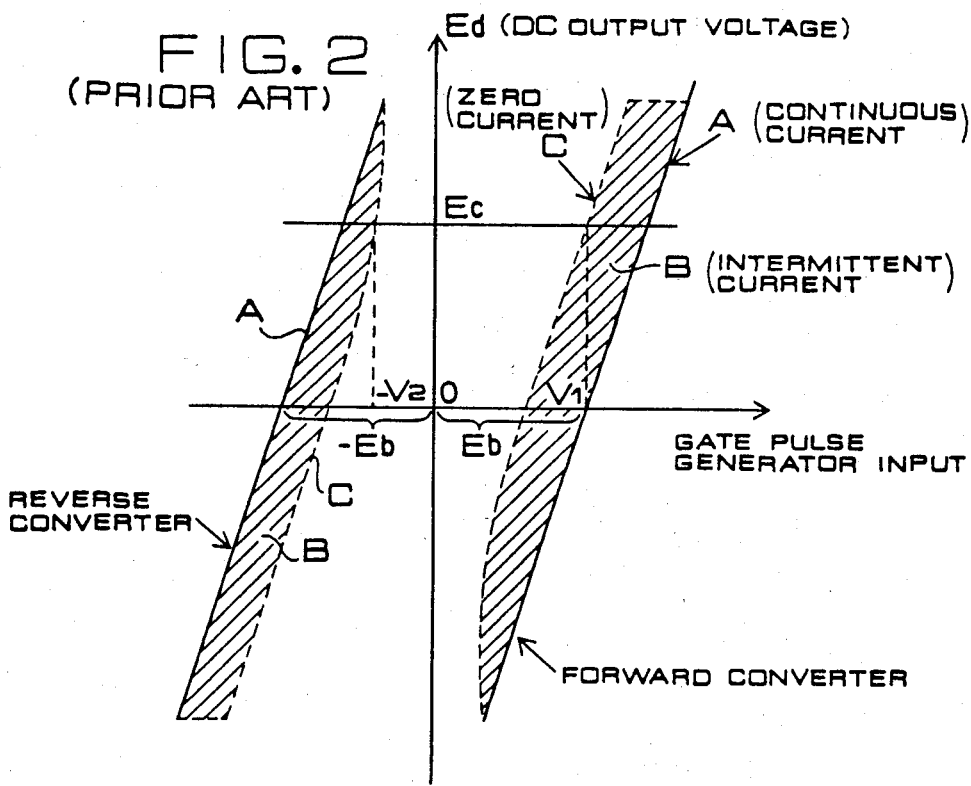
FIG. 2 is a graph used to explain the relationship between the input signal of the gate pulse generator and the d.c. output voltage in the operation of the system shown in FIG. 1.
Figure 3:
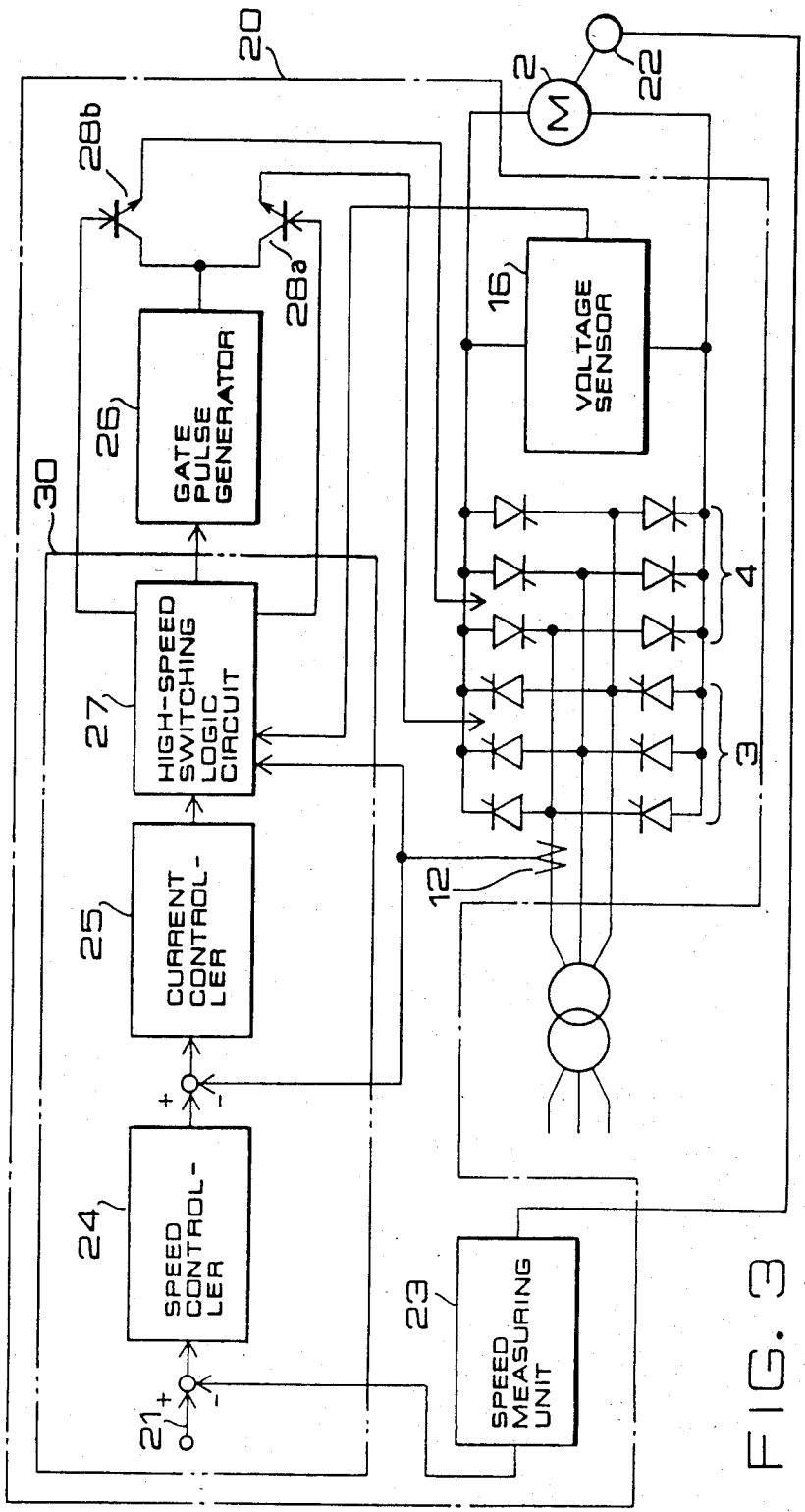
FIG. 3 is a block diagram showing the motor driving rectifying system of the digital control type embodying the present invention.

One embodiment of the present invention will now be described in detail with reference to the drawings. FIG. 3 shows in block form the microprocessor based motor driving rectifying system embodying the present invention. In the figure, the same portions or equivalent portions to those of FIG. 1 are given the common reference numbers, and explanation thereof will be omitted. In FIG. 3, a section 20 defined by the dot-and-dash line is a motor driving rectifying system, and a minor section 30 defined by the dots-and-dash line is a microprocessor based controller. Reference number 23 denotes a motor speed measuring unit which counts pulses from a pulse generator 22 coupled to the drive shaft of the motor 2 and provides a digital value in correspondence to the rotational speed of the motor 2. The controller 30 has a speed command input terminal 21, a block 24 which corresponds to the speed controller 5 of FIG. 1, and another block 25 which corresponds to the current controller 9 of FIG. 1. Both the speed controller 24 and current controller 25 perform computation for the proportional and integral control. The output of the current controller 25 is conducted through a high-speed switching logic circuit 27, as will be described later, to a gate pulse generator 26 which is constituted by discrete digital components. The gate pulse generator 26 incorporates a $\cos^{-1}$ function generator. The gate pulse generator 26 differs from the pulse generator 17 (FIG. 1) in the conventional system in that the input is not biased.

The high-speed switching logic circuit 27, which is the most material portion of this embodiment, will be described in connection with FIGS. 4 and 5.

Figure 4:
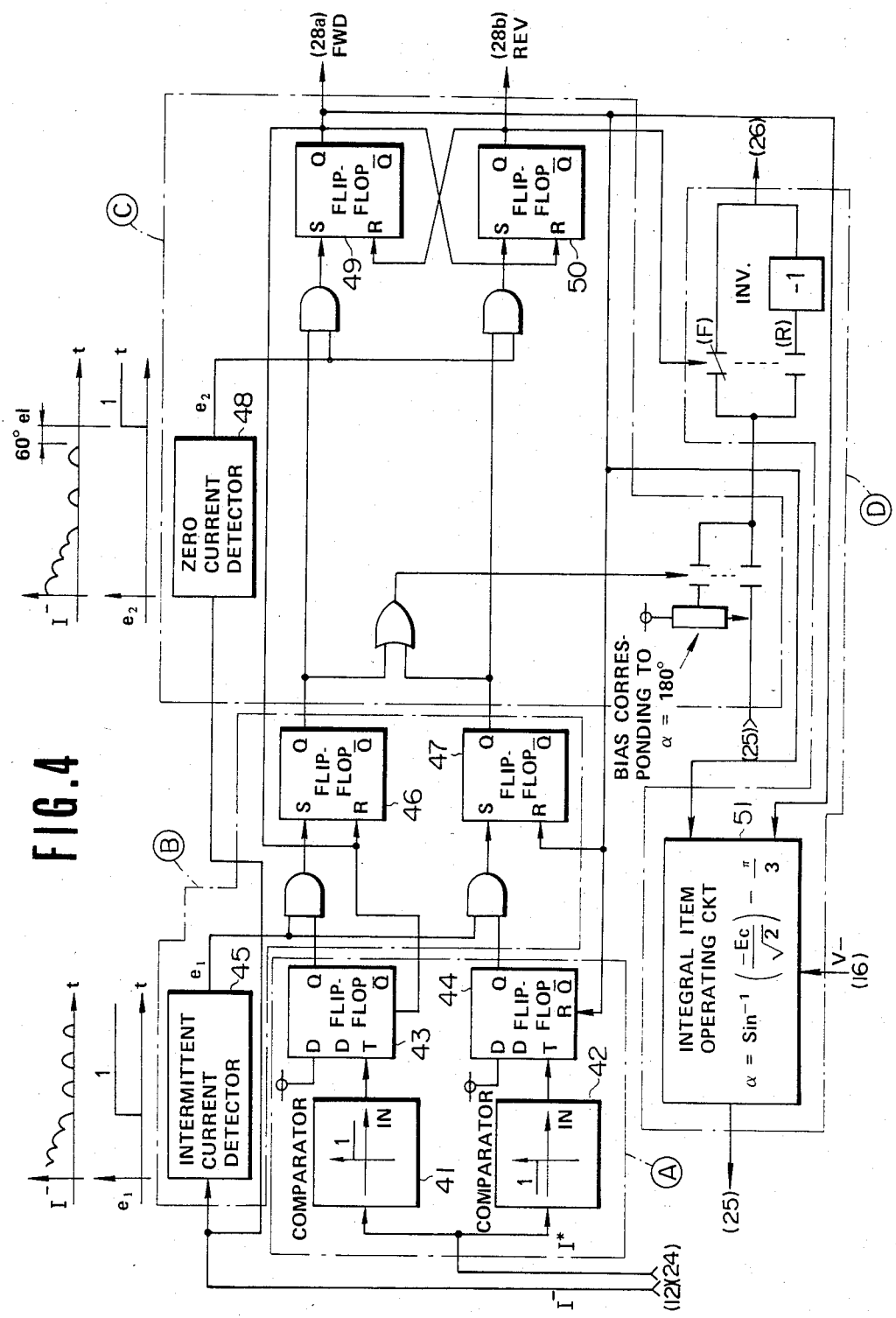
FIG. 4 is a detailed circuit diagram of the high speed switching circuit of FIG. 3.
Figure 5:
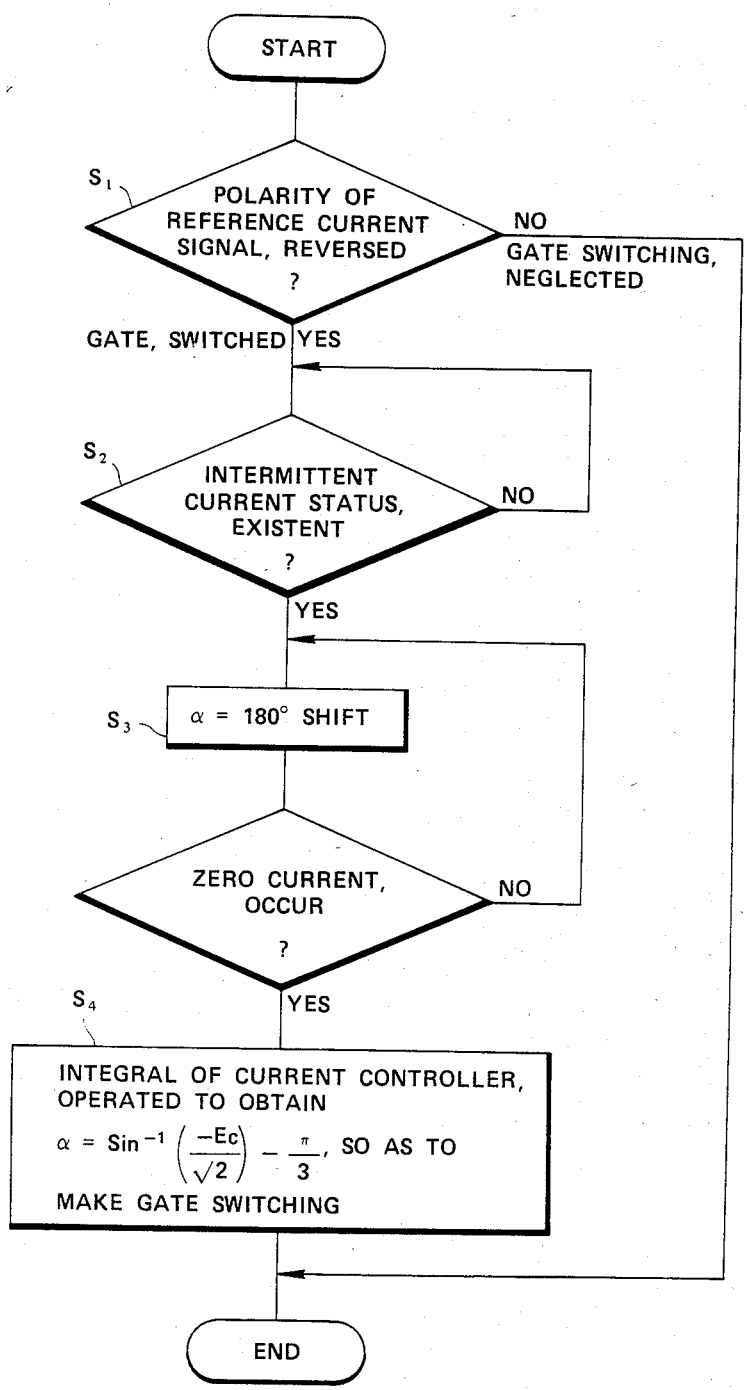
FIG. 5 is a flow chart showing the operation of the high speed switching circuit of FIG. 4.

FIG. 4 is a circuit diagram showing the details of high speed gate switching logic portion 27 of an electric motor driving rectifier shown in FIG. 3, and FIG. 5 is the flowchart thereof.

The condition to determine whether the gate switching operation is required or not is judged from the polarity of the reference current signal, that is, the output from a speed controller 24. ($S_1$ in FIG. 5) Namely, if the reference current signal is positive in its polarity, the positive side (FWD) gate must be ignited. If the present gate is ignited in reverse side (REV), the process should be advanced to gate switching logic portion 27 so as to make gate switching operation.

When the reference current signal is not reversed in its polarity, the gate switching logic portion 27 is neglected.

Even if the reference current signal is negative in its polarity, the process should be carried out in the similar way to advance to the switching logic portion 27 when the present polarity is positive and to neglect the logic portion 27 when the polarity is staying unchanged.

The part Ⓐ in FIG. 4 is the circuit corresponding to this step $S_1$, and the output from a comparator 41 on positive side is input in D-flip-flop 43 when the input signal into the comparator 41 changes from the negative value to a positive value. On the other hand, if the input signal into the comparator 42 changes from the positive value to a negative value, the output from the comparator 42 on the reverse side is input in D-flip-flop flop 44 whose output changes to H level.

Next, when the reference current signal is reversed, the intermittent ON/OFF state can take place immediately provided that the current loop is making normal operation. This condition should be confirmed. ($S_2$ in FIG. 5)

The circuit part corresponding to this step is shown by Ⓑ in FIG. 4, and when intermittent current ON/OFF detector 45 detects any intermittent current, flip-flop 46 or 47 is set and either output goes up to "H" level.

Furthermore, if the state of intermittent current is detected, the gate phase α is shifted to 180° until the current is perfectly reduced to zero. ($S_3$ in FIG. 5)

The circuit corresponding to this step $S_3$ is shown by Ⓒ in FIG. 4.

Namely, when the output from either flip-flop 46 or 47 goes up to "H" level, the output from a current controller 25 is cut off from the gate circuit and a bias corresponding to α=180° is input in the gate circuit.

When a zero current detector 48 detects the zero current under this condition, flip-flop 49 or 50 is set and either one of already set flip-flops among the flip-flops 43, 44, 46, 47 is reset simultaneously.

After the zero current is recognized, the output from the current controller 25 (integral item of proportional integration) is set to the value corresponding to $$\alpha = \sin^{-1}(-Ec/\sqrt{2}) - \frac{\pi}{3}$$

so as to make gate switching operation. ($S_4$ in FIG. 5)

Figure 6:
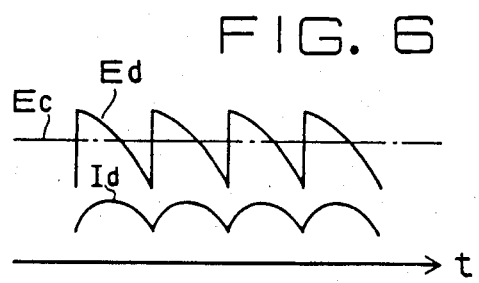
FIG. 6 is a waveform diagram showing the relationship between the rectifier output voltage and the counter electromotive force of the motor during the continuous current operating mode of the system shown in FIG. 3.
Figure 7:
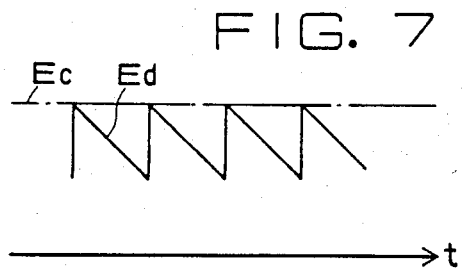
FIG. 7 is a waveform diagram showing the relationship between the rectifier output voltage and the counter electromotive force of the motor during the zero-current operating mode of the system shown in FIG. 3.

The circuit corresponding to this step $S_4$ is shown by Ⓓ in FIG. 4, and when the output from flip-flop 49 or 50 is reversed, the output from the current controller 25 is set, and the gate changeover switch is switched from the present state simultaneously, and thus the operation is finished. FIG. 6 shows the waveform of the output voltage Ed of the rectifying system 20 and the counter electromotive force Ec of the motor 2 when the load current Id flows continuously. FIG. 7 shows the waveform of Ed, indicating that the load current Id becomes zero when the peak value of the output voltage Ed is equal to the counter electromotive force Ec. In this case, the relationship between the firing phase angle α and the counter electromotive force Ec of the motor is expressed by the following equation.

$$Ec = \sqrt{2}\, Es \sin\left(\alpha + \frac{\pi}{3}\right) \qquad (1)$$

where Es is the effective input line voltage.

The high-speed gate switching logic circuit 27, when it does not perform gate switching, passes the proportional and integral output from the current controller 25 directly as a firing phase angle command signal to the gate pulse generator 26. On the other hand, to carry out gate switching the logic circuit 27 shifts the firing phase angle α by 180° so that the load current is forced to become zero. Upon detection of the zero load current Id, the logic circuit 27 reverses the states of the gate pulse switches 28a and 28b, and at the same time shifts the firing angle command signal so that the firing phase angle α meets the equation (1). The integral part of the output from the current controller 25 is made equal to the firing angle command signal as obtained in the above process. The firing phase angle α at this time is expressed by the following equation.

$$\alpha = \sin^{-1}\left(\frac{-Ec}{\sqrt{2}}\right) - \frac{\pi}{3} \qquad (2)$$

where Ec is the counter electromotive force of the motor 2 detected by the voltage sensor 16 when the load current Id becomes zero. Since the firing phase angle α following the gate switching operation has a critical value at which the load current is kept zero, the load current flows progressively as the firing phase angle α advances.

According to the inventive motor driving rectifying system, as described above, the firing phase angle α is shifted by 180° when the gate control of the forward and reverse converters is switched so that the load current is forced to become zero, and after the gate switching, the firing phase angle is shifted to a phase angle at which the current just starts flowing. These two properties enable a significant reduction in gate switching time as compared with the conventional system, whereby a high response and high controllability rectifying system without a time lag of control can be realized.

What is claimed is:

1. A digitally controlled rectifying system used for driving a direct current (d.c.) motor through a forward and reverse converters connected in an anti-parallel fashion so as to block a circulation current, said system comprising:

(a) a pulse generator coupled to the drive shaft of said motor;
(b) a speed measuring means which counts pulses generated by said pulse generator and produces a digital value in correspondence to the rotational speed of said motor;
(c) a speed controller which receives a speed command signal and the output of said speed measuring means;
(d) a current controller which receives the output of said speed controller and the output of a current transformer coupled to an alternating current (a.c.) input power line to said converters;
(e) logic means which receives the output of said current transformer and the output of a voltage sensor connected to detect the output voltage of said converters, said logic means operating on the firing phase angle of said converters to shift by 180° at a time of gate switching operation so that the load current is forced to become zero, said logic means operating on the firing phase angle of said converters to shift following the gate switching operation so that the load current is substantially zero; and switch means operated by said logic means to supply gate pulses to one of said forward and reverse converters.

2. A rectifying system according to claim 1, wherein said speed controller, said current controller and said logic means in combination comprise a microprocessor based controller.

3. A rectifying system according to claim 1 wherein sa said logic means comprises:

(a) a first means ( (A) in FIG. 4, S₁ in FIG. 5) for determining whether the gate switching operation is required or not is judged from a reference current signal comprising said output of said speed controller and transmitted from said speed controller to said first means;
(b) a second means ( (B) in FIG. 4, S₂ in FIG. 5) for effecting the intermittent ON/OFF state immediately provided that the current loop is making normal operation,
(c) a third means ( (C) in FIG. 4, S₃ in FIG. 5) for shifting the gate phase angle α to 180° until the current is reduced to zero, when the state of intermittent current is detected,
(d) a fourth means ( (D) in FIG. 4, S₄ in FIG. 5) for setting the output from said current controller to the value corresponding to $$\alpha = \sin^{-1}(-Ec/\sqrt{2}) - \frac{\pi}{3}$$

α is the firing angle and Ec is the electromotive force so as to make gate switching operation after the zero current is recognized.

* * * * *

UNITED STATES PATENT AND TRADEMARK OFFICE
CERTIFICATE OF CORRECTION

PATENT NO. : 4,567,408
DATED : January 28, 1986
INVENTOR(S) : Masamichi Mitsuhashi It is certified that error appears in the above-identified patent and that said Letters Patent is hereby corrected as shown below:

Column 6, line 32, delete "sa".

Signed and Sealed this

First Day of July 1986

[SEAL]

Attest:

DONALD J. QUIGG

Attesting Officer    Commissioner of Patents and Trademarks